Sept. 29, 1942.   W. C. HARCUS   2,297,553
COMPOSITE COLOR PHOTOGRAPHY
Filed May 1, 1940
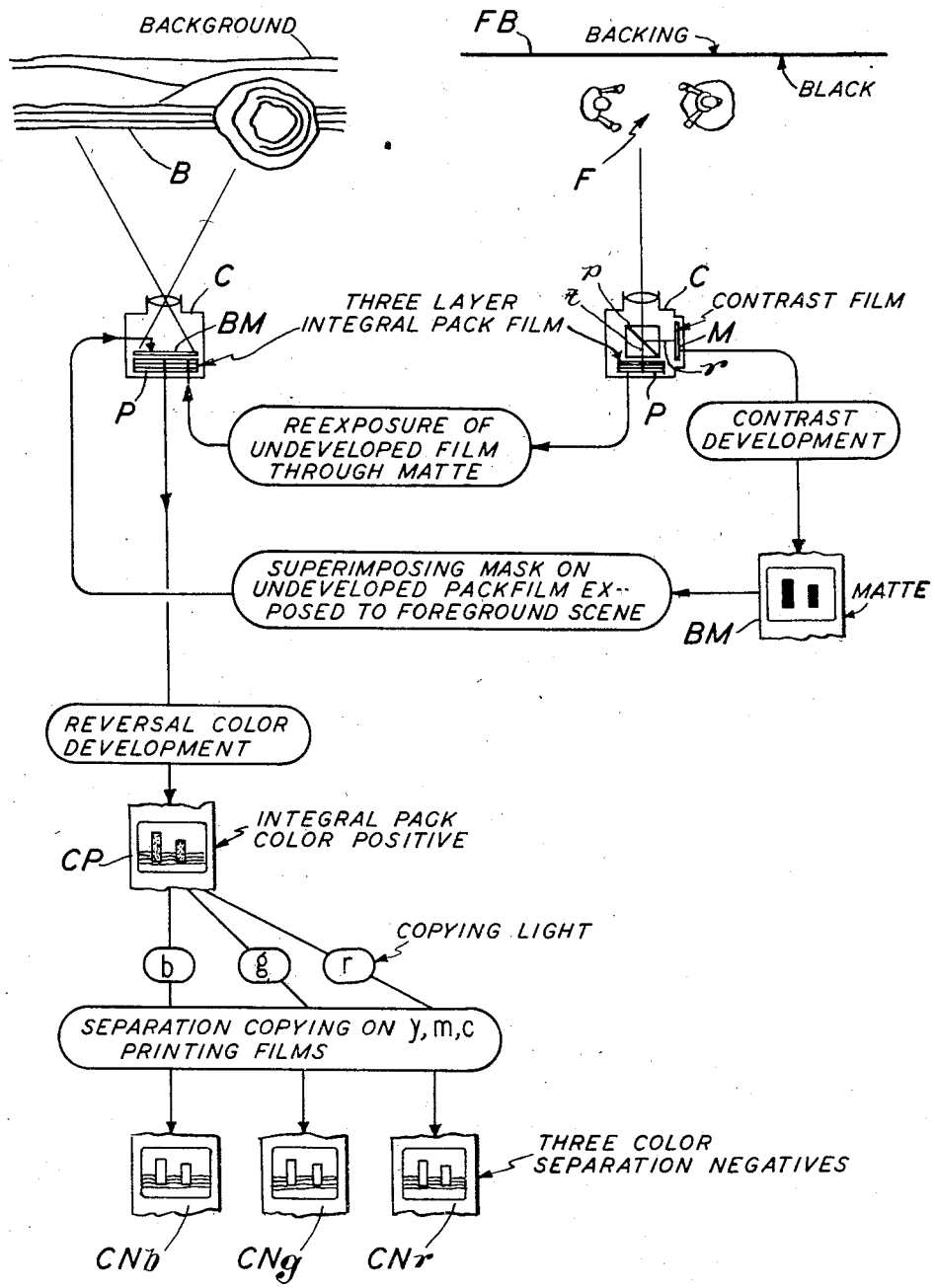

Patented Sept. 29, 1942

2,297,553

UNITED STATES PATENT OFFICE 2,297,553

COMPOSITE COLOR PHOTOGRAPHY

Wilmore C. Harcus, Van Nuys, Calif., assignor to Technicolor Motion Picture Corporation, Los Angeles (Hollywood), Calif., a corporation of Maine Application May 1, 1940, Serial No. 332,745

3 Claims. (Cl. 88—16)

In motion picture production use is often made of so-called rear projection, for the purpose of economy as well as in order to provide effects which could otherwise not be obtained. As well known, rear projection utilizes positive records of background scenes with or without background action taken in nature or from miniature or full size studio set-ups, which positives are then projected from the rear on a screen in front of which foreground scenery is set up and foreground action is performed; the foreground scene and action and the picture projected on the screen are taken with a camera running in synchronism with the rear projector.

This rear projection technique, however, has various disadvantages especially for purposes of color photography. Such disadvantages are, for example, difficulty of providing on the background screen the necessary level of illumination, limitations in size of rear projection screens, loss of definition, desaturation of color, non-uniformity of the illumination level of the background field (hot spot) and disturbing grain or image mottle due to inherent characteristics of the screen.

In accordance with the present invention, these difficulties are overcome by directly combining background and foreground scenes without the intermediary of projecting the former on a screen in front of which the latter is performed; this direct record combination is accomplished with the aid of so-called mattes, that is, silhouette records with opaque portions covering the foreground portion of the picture area whereas the background portion is practically clear.

It has heretofore been proposed to combine various picture portions by means of such mattes; however, in the above-mentioned field of combining large background fields with full foreground scenes for purposes of color photography, these conventional methods yield only unsatisfactory results for example because of the considerable time they require for carrying out the various stages of laboratory processing before a producer can see whether or not a composite print is satisfactory, and because of difficulties in timing foreground and background action for proper coincidence of significant action.

It is one of the principal objects of the present invention to provide an improved process of making composite motion picture records with the aid of a matte which is especially suited for color photography (although it has certain features which may be advantageous in black and white cinematography), which simplifies the control of the necessary steps and considerably reduces their number and hence the time and cost required, without impairing in any respect the quality of the resulting final record.

In one of its aspects, the invention contemplates the use of integral pack film for recording the color aspect components of background and foreground fields; in another aspect, it involves the utilization of a procedure for obtaining extreme contrast silhouette prints, in connection with a peculiar illumination of the foreground scene, for obtaining mattes for purposes of color photography in a simple and yet satisfactory manner; in a further aspect it proposes the combined use of integral pack and matte records for making color separation records on separate supports, for purposes of conventional dye transfer printing; in still another aspect, the invention proposes the exposure of one object field portion on a film already containing a latent record of another field portion, through a matte exposed together with, and covering the latter field portion.

These and other objects, aspects and features of the invention will be apparent from the following description of several practical embodiments which are representative of its genus; the description refers to a flow diagram of the various steps of the method according to the invention.

In this figure, B is a background of any desired type as a landscape, seascape or interior. A foreground scene is indicated at F by two persons acting in front of a black backing FB. This backing is not illuminated and may be made of strongly light-absorbing material as black velvet, so that the intensity of any light reflected therefrom will be below the lowest intensity of the light reflected from the foreground. Consequently, the shade detail of the foreground is recorded at the usual density, whereas the backing will be recorded below the minimum exposure level of the foreground. Background B and foreground F are illuminated with light of the spectral ranges usual in color motion picture work.

The foreground scene F is first photographed, against the backing FB, by means of a multiple exposure camera C for example of the type described in Patent No. 2,072,091. Such cameras have a light divider $p$ which splits the image-carrying beam into a directly transmitted and a reflected component beam, indicated at $t$ and $r$, respectively. In one aperture of this camera, preferably in the one receiving the directly transmitted light, an integral pack film P is exposed. This film is of the type carrying joined on a single support at least two layers, strata or series of emulsion particles adapted to record different color aspects of an object field. Such film is now well known and may be of the kind carrying several differently sensitive layers which are after exposure simultaneously developed whereupon the positive records in sensitive emulsion, remaining after this initial development are step by step developed in subtractive dyes by means of color-forming developers, or of the type incorporating in each layer a different colorless color former, respectively, which furnishes, after development of the silver negatives, with a suitable single developer positive records in different subtractive dyes of the appropriate subtractive color ranges, or of the type carrying several differently dyed layers which are under the control of negative silver records bleached to furnish positive records in the appropriate subtractive transmission ranges.

In the reflected beam r there is simultaneously exposed a single film which is then processed to provide a silhouette matte negative BM which has clear background portions corresponding to black backing FB and opaque foreground portions representing a record of foreground scene F. The preparation of such a silhouette is sometimes difficult especially if the difference of backing and minimum foreground illumination level, respectively, is slight; however it was found that the method described in copending application Serial No. 314,059, furnishes satisfactory results even under difficult conditions.

According to this method, the film in beam r is sensitive to two light ranges (for example, a film according to Patent No. 1,804,727, of May 12, 1931, to Eastman A. Weaver) so that light composed of two ranges is differently absorbed by the emulsion. The latent record is developed and colored with a dye strongly absorbing the light used for copying with the silhouette record; in this manner it is possible to convert original records with density scales varying on either side of an intermediate density value, into silhouette copies effectively reproducing these two density scales as two extreme density values.

It will be understood that a camera of the above-mentioned type provides for accurately reproducible registration between the two simultaneously exposed films.

The exposed but unprocessed film P is then again threaded into the direct beam aperture of camera C in superposition with processed matte BM in front thereof, in such a manner that the silhouette records of the foreground action will be placed in suitable relation and register with the images of the corresponding background scene or action. A camera of the above-mentioned type may be used for that purpose as well as for the foreground exposure, especially if the transmitted beam aperture is equipped for exposure of two superimposed films, which is easily feasible as will be evident from the above patent. It is also feasible to thread both the unprocessed integral pack film and the finished matte film in the reflected beam film gate of a camera similar to that described in the above patent, which aperture is adapted to accommodate two superimposed films.

The exposure to the background of film P through matte BM will furnish a film with latent records of foreground and background, respectively, the previously exposed foreground scene record being now protected by matte BM, and the background being recorded on that area which was not affected during the first exposure. As mentioned above, foreground scene F and black backing FB are illuminated at such intensities that the exposures from the darkest foreground portions will be somewhat higher than the exposure from the backing. It will be understood that matte BM must be formed in a medium which transmits neither of the light ranges used for exposing the respective color aspect records.

Film P is then converted according to one of the well known processes (for example reversal color development as mentioned above) into a color positive CP which records foreground action F against background B and will not have either unexposed or doubly exposed portions provided proper registration was maintained throughout the process, which is entirely feasible with apparatus now available.

The positive color record CP may then be separated into three color separation records, for example by printing the record CP upon the single layer film CNb with blue light to provide a separate blue aspect record, and similarly printing the green and red records CNg and CNr with green and red light respectively.

It will be understood that the blue copying light is absorbed only by the yellow (minus blue) dye in which the blue aspect record of film CP is printed, whereas it is transmitted by the two other aspect records printed in magneta (minus green) and cyan (minus red).

By exposing two other films in similar manner to the green and red color aspect records, respectively, of film CP, with green and red light absorbed by the magenta (minus green) and cyan (minus red) dye, respectively, in which these records are formed, the two negatives CNg and CNr are printed representing green and red color aspect records, respectively.

The color separation records CNb, CNg and CNr can then be used for manufacturing final color prints, for example by preparing therefrom gelatin relief matrix films for the purpose of printing a final positive film by way of dye transfer from these matrices on to a blank film; this process is well known and for example described in patents, Nos. 1,919,673 and 1,707,710.

It will be further understood that it is feasible to reproduce the integral pack CP with its three color aspect records by printing it with the aid of a process different from the above-mentioned imbibition dye transfer process, for example, by photographic printing on another integral pack film. In the latter instance, the intermediary of three color separation records on individual supports may be unnecessary and the three layers of the final integral pack film will take the place of separation records CNb, CNg, CNr.

It should be understood that the present disclosure is for the purpose of illustration only and that this invention includes all modifications and equivalents which fall within the scope of the appended claims.

I claim:

1. In the art of making composite photographic records of two object fields with mattes for masking selected picture portions during exposure, the method of producing pictures in natural colors which comprises illuminating a foreground field and a backing therebehind to degrees bringing the light reflection values from all points of the backing below the lowest value of the reflection of similar light from the foreground field, making in one component of an image carrying beam latent color separation records of said foreground field against said backing, simultaneously exposing in another component of said beam on a separate support a further latent record of said foreground field against said backing, photographically preparing from said further record a silhouette matte of maximum contrast between portions exposed with light from said foreground field and portions exposed with light from said backing, and exposing said latent records through said matte to a background field.

2. In the art of making composite photographic records of two object fields with mattes for masking selected picture portions during exposure, the method of producing pictures in natural colors which comprises illuminating a foreground field and a backing therebehind to degrees bringing the light reflection values from all points of the backing below the lowest value of the reflection of similar light from the foreground field, making in one component of an image carrying beam latent color separation records joined on a single support of said foreground field against said backing, simultaneously exposing in another component of said beam on a separate support a further latent record of said foreground field against said backing, photographically preparing from said further record a silhouette matte of maximum contrast between portions exposed with light from said foreground field and portions exposed with light from said backing, and exposing said joined latent records through said matte to a background field.

3. In the art of making composite photographic records of two object fields with mattes for making selected picture portions during exposure, the method of producing pictures in natural colors which comprises illuminating a foreground field and a backing therebehind with substantially while light to degrees bringing the light reflection values from all points of the backing below the minimum value of the reflection of similar light from the foreground field, exposing in one component beam of a light dividing camera three latent color separation records joined on a single support of said foreground field against said backing, simultaneously exposing in a second component beam of said camera in registerable relation to said latent records on a second support a fourth latent record of said foreground field against said backing, photographically preparing from said fourth record a silhouette matte with substantially opaque portions exposed with light from said foreground field and substantially clear portions exposed with light from said backing, and exposing said joined records through said matte in register therewith to a background field.

WILMORE C. HARCUS.